(12) United States Patent
Wu et al.

(10) Patent No.: US 7,194,596 B2
(45) Date of Patent: Mar. 20, 2007

(54) METHOD OF EFFICIENT DATA MANAGEMENT WITH FLASH STORAGE SYSTEM

(75) Inventors: Chien-Hung Wu, Hsinchu (TW); Jen-Chieh Lou, Feng Yuan (TW); Chien-Hua Chu, Ping Tung (TW); Jui-Chien Chen, Yuan Ho (TW)

(73) Assignee: SimpleTech Global Limited, George Town (KY)

( * ) Notice: Subject to any disclaimer, the term of this patent is extended or adjusted under 35 U.S.C. 154(b) by 367 days.

(21) Appl. No.: 10/863,210

(22) Filed: Jun. 9, 2004

(65) Prior Publication Data

US 2005/0278479 A1    Dec. 15, 2005

(51) Int. Cl.
*G06F 12/00* (2006.01)
(52) U.S. Cl. ........... 711/203; 711/103; 365/185.33
(58) Field of Classification Search ............ 711/103, 711/203; 365/185.33
See application file for complete search history.

(56) References Cited

U.S. PATENT DOCUMENTS 7,035,993 B2 *  4/2006  Tai et al. ............... 711/206

* cited by examiner

*Primary Examiner*—Reba I. Elmore
(74) *Attorney, Agent, or Firm*—S. Jalal Sadr

(57) ABSTRACT

A data management for a flash memory device is disclosed. The device includes a screen virtual sector table and a virtual unit versus physical unit table (V2P table) for each block. With the auxiliary of the screen virtual sector table and v2p table, the data programming into the target block of the flash memory is in accordance with the data receiving order, which is from lower page number to higher page number in case the target block is free. The data can be written into the target block contains data already through one or two temporal block(s). The conventional LBA data transfer protocol can still be applied to the flash memory device of this invention.

6 Claims, 5 Drawing Sheets

METHOD OF EFFICIENT DATA MANAGEMENT WITH FLASH STORAGE SYSTEM

FIELD OF THE INVENTION

This invention relates to a method of about data storage for a flash memory apparatus, more particularly to a method of about data access for a flash memory apparatus having a screen virtual sector table for each block to record the position relationship between the logic sector number and the virtual sector number.

BACKGROUND OF THE INVENTION

A flash memory is known to have characters of lower power consumption, fast data access rate, and can endure vibration and/or movement and hence is a kind of data storing media with highly stability and security. For the flash memory, the way of data programmed or erased is generally based on block by block. Once, the data are stored in the flash memory, no electrical power is demanded to preserve the data for over 10 years. This advantage makes other conventional portable stored device inferior. For instance, the hard disk driver or soft disk driver all require a reading head to read or write the data on the specific position of the optical or magnetic media disk rotating and bring by a stepping motor. In general, these types of data storage devices are not secure and inferior to the portable due to the vibration.

Hence, a data storage apparatus without stepping motor such as flash memory has a sufficient competitiveness to become a massive hit in the present and future. For example, the electrical merchandise such as DSC (digital still camera), mp3 player, hand-held computer or PDA (personal digital assistant), cellular phone, flash memory is a one of most critical members.

Generally, the basic architecture of a flash memory apparatus is blocks therein. Each block may contain 32, 64, 128 or more pages or sectors and each page consists of 1 or 4 virtual sector(s) in accordance the memory specification. Each sector, typically, is constituted 512×8 cells and thus can store 512 bytes. The virtual sector herein is distinct from the physical sector. Physical sectors may contain defect(s) in some bocks and result in data therein unstable. Hence, while formatting the flash memory, those blocks are unusable and will be marked. The virtual sectors are those sectors exclude sectors in the bad blocks. The virtual sectors are then renumbered by control chip.

On the other hand, the basic unit of data access for a host is not a block but a logic sector. Therefore, the host communicating with the flash memory apparatus demands a conversion table of logic sectors to virtual sectors.

For example: assume each block contains 64 pages and each page has 4 virtual sectors. The formula are as follows:

Block number=quotient of (logic sector number/64 pages*4 virtual sectors)

virtual sector number remainder of (logic sector number/64 pages*4 virtual sectors)

The flash memory can only be used after formatting. It is carried out in a manner of block by block electrically erasing electrical charges in the floating gate. The data writing or programming is by storing the charges into predetermined memory cells of the target block. Therefore, to satisfy the protocol of the conversion table of logic sectors to virtual sectors, the data stored in the target block has to move or copy frequently to stratify the protocol the conversion table. It is not only detrimental to the lifetime of the flash memory but also disadvantage to the writing efficiency.

An object of the present is to introduce concepts of screen table and virtual block to physical block table (V2P table). The screen virtual sector table keeps tracing the virtual sector number versus logic sector number and the V2P table having FSP (free sector point) to record the number of free pages make the host or control chipset know the status of available pages in the target block. With these tables, the data programming is no longer based on block but based on page or virtual sector. The data in the buffer is written into the target block not from a target page in accordance with the conversion table but from a lowest page if the target block is free. In another situation, the data in the buffer can still be written into a target block if the target pages are available.

SUMMARY OF THE INVENTION

The present invention discloses a data accessed management system for a flash memory device. Especially for those group of data in a unit of called logic sector are sent by a host that desires to be programmed into physical memories of the flash memory device. The data accessed management system comprises: (1) a number of virtual block cells;(2) a buffer; (3) a plurality of SVST (screen virtual sector table); and (4) a plurality of V2P (virtual block to physical block). The buffer is those memories belonged to the host or RAM in the controller of the flash device. The conversion relations between the logic sectors are sent by a host and the destinations of data stored are recorded in a SVST of corresponding virtual block. The V2P is memories of 16 bit cells with 9 bits recorded the virtual block number of the V2P belonged corresponding to what the physical block number is, 6 bits provides as free sector point (FSP) recording, and 1 bit for physical condition of the physical block recording.

Therefore, the data in the buffer are written by data management system from the sector number 0 of the destination block if the destination block is free. The FSP and SVST are updating too. In situation of the destination-block containing data already but the destination sectors are available, the data before the destination sectors are copied to a temperate block and then data in the buffer are programmed by the data management system into the destination sectors of the temperate block, and then the data post the destination sectors are copied to the corresponding sectors.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

According to the aforementioned description in the background of the invention, the operation no matter erasing or writing to the flash memory apparatus is basic on a unit of block. Conventionally, to make a group of data in a form of logic sectors sent from the host store to the virtual sectors of the flash memory apparatus satisfy the protocol provides by operation system, the target memory block (or called destination block) must be free. The flash memory apparatus in accordance with the present invention can overcome forgoing constraints. The data can be written into the destination block in order of the lowest page number to the higher page number no matter the lowest page number is the corresponding page of the logic sectors or not. Moreover, the data can still be written into target pages of data free of the destination block even the target block had data therein.

For purpose of illustrating convenience, in the present specification, one page equal to one sector is assumed and used as an exemplification. It is not intended to limit the claim scope. Any one who skills in the art comprehended that a page memory can have four sectors. In the situation, the difference is only the conversion between the logic sector number and the virtual sector number.

According to the present invention, each block has a V2P table. The V2P table is a description table of 16 bits. Form bit of the $0^{th}$ to the $8^{th}$ depicted the position relationship between the virtual block and physical block. From bit of the $9^{th}$ bit to the $E^{th}$ (Hex) bit, 6 bits in total depicted the usage status of the current block. These 6 bits are called FSP (free sector point) to indicate the usage status of the block. In a preferred embodiment, if FSP=111111 (b) represents the block is full and thus none of any page is available where "b" represents a binary code. The binary code in between 000001 to 111110 indicates the status of available page. For example: the FSP=000111 expresses 7 pages not available, the pages from $8^{th}$ is free. As a result, the control chipset in the flash memory apparatus or the host can know the usage status of the block.

As the FSP=0, it expresses that the data stored in the virtual sectors are not according to the conventional conversion table. Consequently, while data are read or written, the screen virtual sector table (SVST) are referenced by the host or the control chipset.

Figure 1:
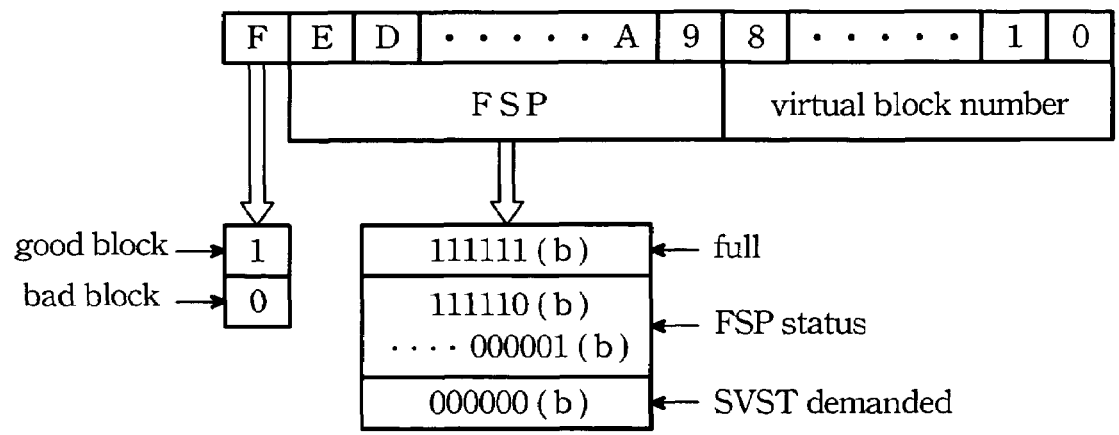
FIG. 1 illustrates a format of 16 bits of V2P according to the present invention.
Figures 2A, 2B:
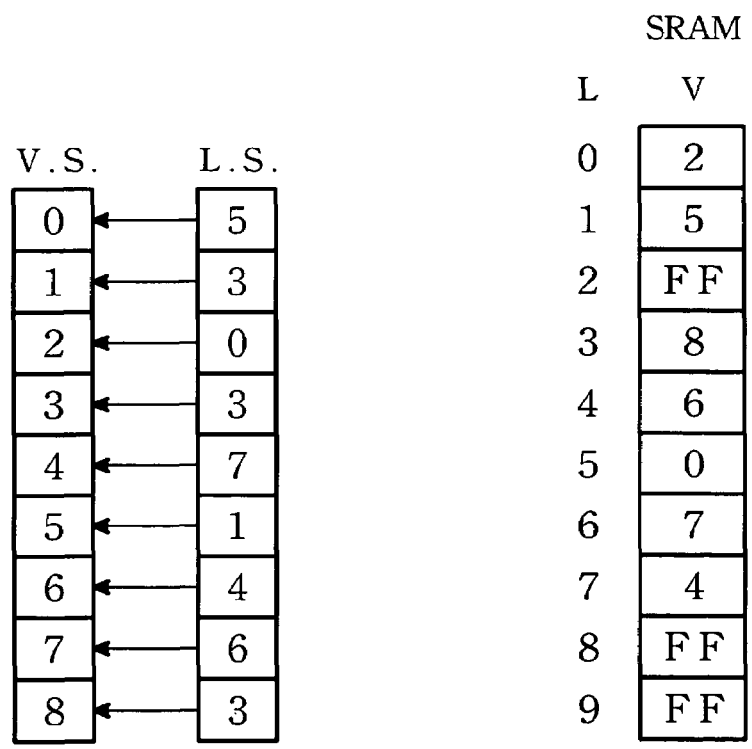
FIG. 2A shows data written into the virtual sectors in accordance with the order of the data received not the order of the logic sector number.
FIG. 2B shows a SVST that provides a conversion table between the logic sector number and the virtual sector number.

The SVST is a table recorded in the static random access memory (SRAM), which dynamically records the position relationship between the logic sector number and the virtual sector number while the data in the buffer are written into the virtual sectors. FIG. 2A and FIG. 2B show an example. FIG. 2A illustrating the consecutive virtual sector numbers from 0 to 8 having individual contents to index the logic sector number in each. FIG. 2B is a SVST. In terms of the SVST, host or control chipset can find easily the corresponding destination of the logic sector number. For instance, referring to FIG. 2B, the content of the address 0 is 2 means that the $0^{th}$ logic sector is positioned at the $2^{nd}$ virtual sector, please see FIG. 2A. The content of the address 1 is 5 means that the $1^{st}$ logic sector is positioned at the $5^{th}$ virtual sector. The content of the address 2 is FF means that the $2^{nd}$ logic sector is not written into the flash memory. The content of the address 3 is 8 means that the $3^{rd}$ logic sector is positioned at the $8^{th}$ virtual sector. Worthwhile, the contents of 1st, the $3^{rd}$, and the $8^{th}$ of the virtual sectors shows the same data, "3" means only the $3^{rd}$ logic sector is recorded into the $8^{th}$ virtual sector. In the other words, the SVST traces the last logic sector position only, which is stored in the virtual sector 8.

In addition, the FSP depicted by 6 bits is for the situation of a block having 64 pages or under. It does not intend to limit the claim scope. Therefore, if a block content 128 pages, 7 bits are demanded to depict the FSP. The most significant bit (the F (Hex) bit is to depict the physical status of the block. As the $F^{th}$ bit=1, it expresses physical status of the block is good, the $F^{th}$ bit=0 expresses the block is bad.

FSP in V2P table and the SVST in accordance with the present invention can provide minimum data movement, extend the lifetime of the flash memory, and provide good writing efficiency without changing the conventional data storing protocol between the host and the flash memory. To illustrate, following flow charts will provided.

Six typical situations will be discussed to illustrate the data access management system for a flash memory device in accordance with the present invention. Assuming the data queue, such as a first record N having n logic sectors and/or a second record M having m logic sectors are received and temperate stored in buffers and waits to write into flash memory. The buffer is those memories belonged to the host or RAM in the controller of the flash device. The typical situations include: (1) the destination block is free; (2) the destination block of both first record N and second record M is the same and the destination block is free; (3) the destination block contains some data already, but the capacity of the destination sectors of the destination block are enough to store the first record; (4) the destination block contains some data already and the capacity of the destination sectors of the destination block are enough to store both records N and M; the starting destination sectors N' and M' are assumed, respectively, for record N and M herein. (5) the destination block contains some data already, but the capacity of the destination sectors of the destination block are enough to store the first record N and second record M. However, the position of the record M is before the record N; (6) the destination block contains some data already and the capacity of the destination sectors of the destination block are not enough to store the first record.

Figure 3:
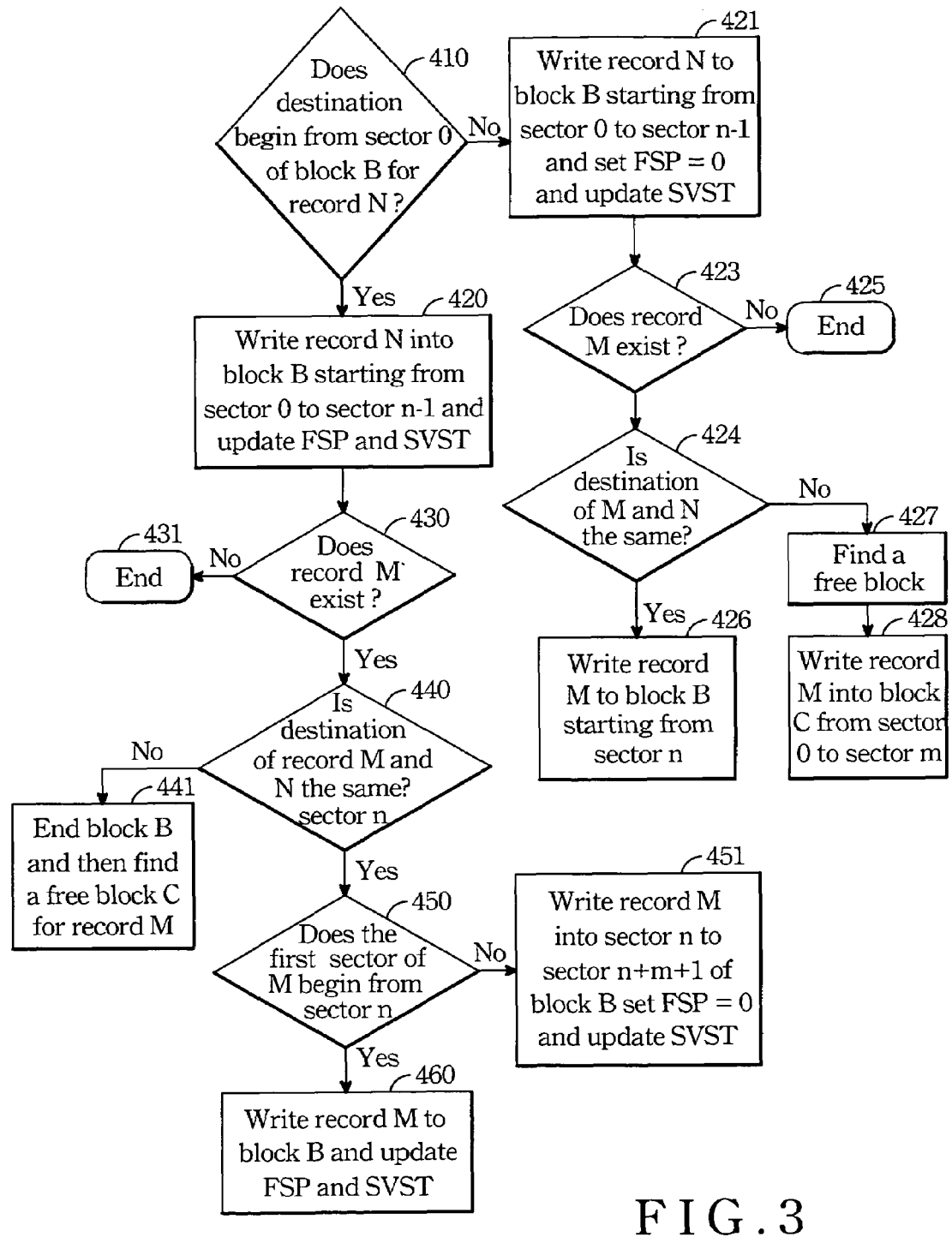
FIG. 3 to FIG. 6 shows flow charts for varied situations of data being programmed.

In cases of (1) and (2), please see a flow chart shown in FIG. 3. Firstly, in step 410, the step is to determine if the destination sector number begins from the sector number 0 of the destination block B or not. If it is true, proceeding to the step 420. The step 420 writes down n sectors of the first record N from the sector number 0 to sector number n−1 of the block B and then update the FSP value to FSP=n in binary code. The position relationship of the logical sector numbers to virtual sector numbers are recorded in the SVST.

After step 420, the step 430 is to determine if the buffer contains a second record M. If it is false then ending the procedure, see the step 431. If it is true, then proceeding to the step 440 to determine if the destination block of the second record M is the same block as record N. If the result of the step 440 is true, proceeding to the step 450 to determine if the destination sector of record M is just follow the ending of the record N, i.e. beginning form sector n. If the result of the step 450 is true, proceeding to the step 460. In the step 460, the record M is written into the virtual sectors and updates the FSP according to the occupations of the virtual sectors in this block. The position relationship of the logical sector numbers to virtual sector numbers are recorded into the SVST too. If the result of the step 450 is false, see the step 451, the record M is still written into the virtual sectors followed the ends of the record N. the SVST is updated and FSP=0 of this block is recorded.

Turning back to the step 440, if the result is false, then the step 441 is followed. In step 441, the block B data written is ended and finds another free block C to write the second record M. The procedures for the second record M written is the same as shown before for the first record N.

Turning back to the step 410, as the result of the step 410 is false. It means that the destination sector for the first record N is not from the virtual sector number 0. In accordance with the present invention, the first record N is still being written from the lowest virtual sector number 0 of the destination block B and FSP=0 is set, as is shown in the step 421. Thereafter, the step 423 is to determine if a second record M is in buffer. If it is false, then ending the programming. If the result of the step 423 is true. Another decision step 424 is proceeding. In step 424, it determines if the destination block of the second record M the same as the first record N. As the result is false, search another free block C, as is shown in step 427, and then programs the second record M to the virtual sector number 0 of the block C, as is shown in step 428. In case of the step 424 is true, the second record M is written and begins from the virtual sector number consecutive the ending virtual sector number of the first record N, please see the step 426. It is noted that the SVST and FSP are updated once while data are programmed into the flash memory apparatus in accordance with the present invention.

Figure 4:
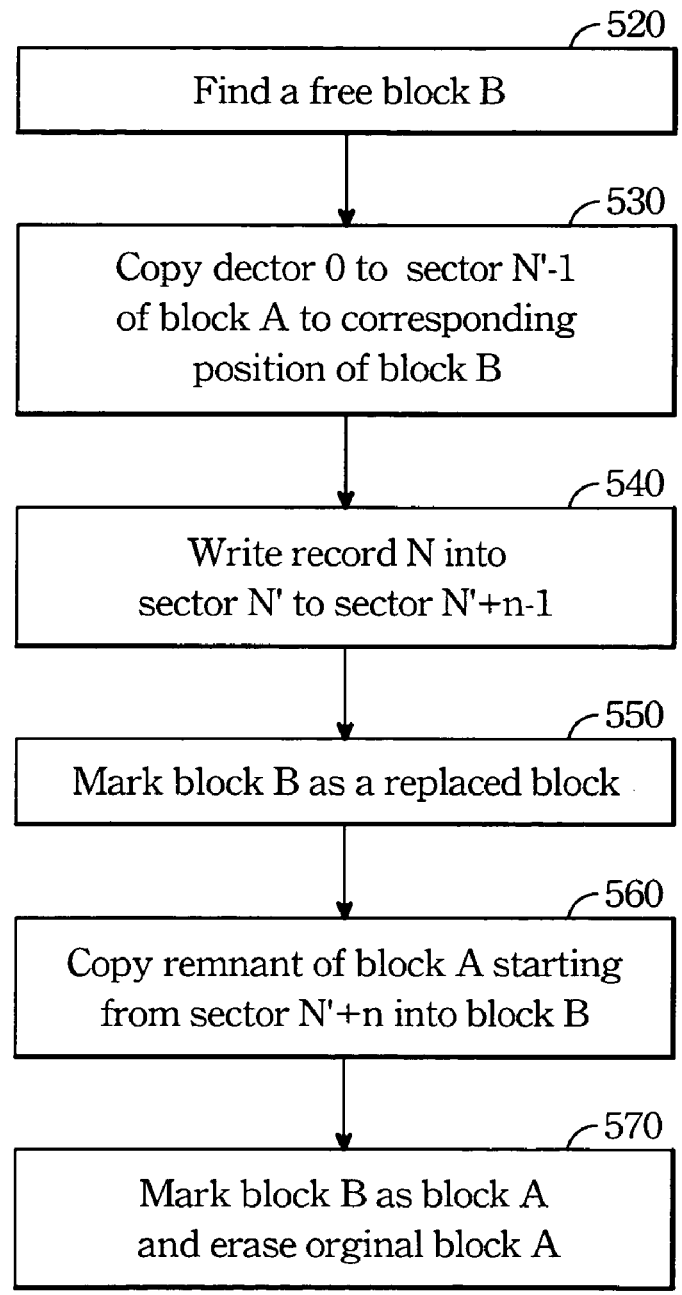

In case of (3), the destination block A contains data already but the destination sections of the block A are free for storing the data of the first record N. The starting destination sector of the record N is N'. Please see the flow chart in FIG. 4.

First, in step 520: finding a free block B and then go to the step 530: copy the contains from the virtual sector number 0 to the virtual sector number N'-1 of the block A to the block B as is seen in step 530. In step 540, the data of the first record N in the buffer is then written into block B from the virtual sector number N' to sector N'+n-1. In step 550, the block A is marked as a replaced block. Afterward, in step 560, the remnant initiating from the virtue sector number N'+n of the block A are copied to the same virtual sectors numbers of the block B. In step 570, the block B is then marked as block A. The contains of the original block A are erased thereafter.

Figure 5:
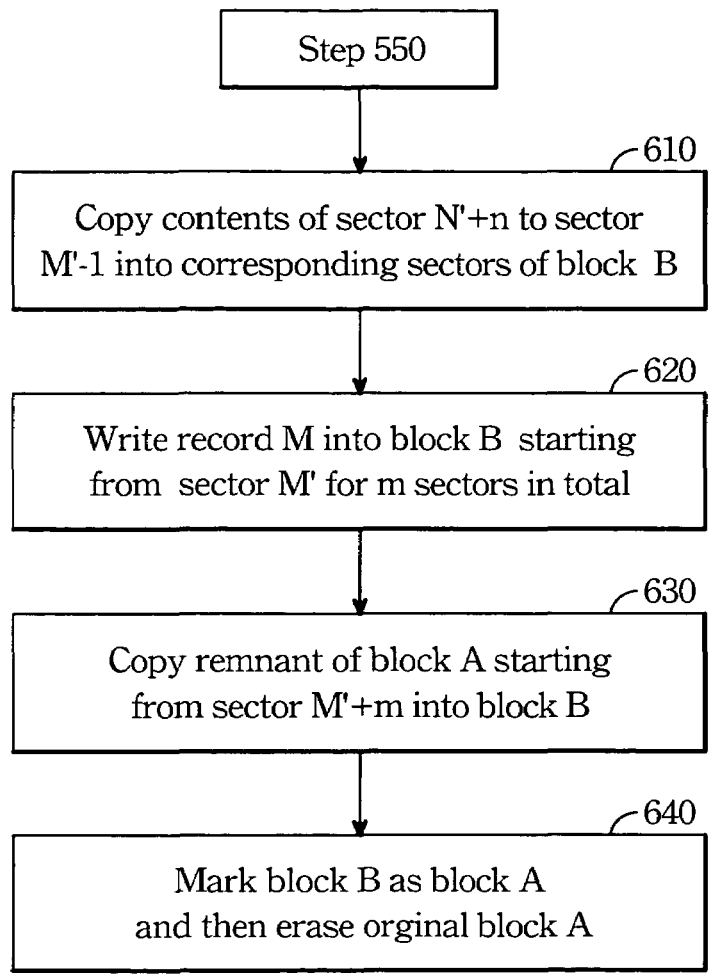

In case of (4), the destination block A contains data already and the destination sections of the block A are available for storing the data of the first record N and the second record M and the logic sector number of the record M is post the record N. In this situation, the programming procedures for the first record N are the same as aforementioned and thus the detailed descriptions before step 550 are skipped. Only the procedures for the second record M are illustrated. Please see the flow chart in FIG. 5. In step 610 the contents in the sectors from the virtual sector number N'+n to the virtual sector number M'-1 of the block A is copied to the corresponding virtual sectors of the block B. In step 620, the data of the record M in the buffer are then written into the destination sectors of the block B and the remnant of the block A from the virtual sector number M'+m are then copied to the corresponding virtual sectors block B. The resultant block B thus has all of the data in the block A and with additional records M and N. In step 630, the data in the original block A are erased and the block B is marked as block A.

Figure 6:
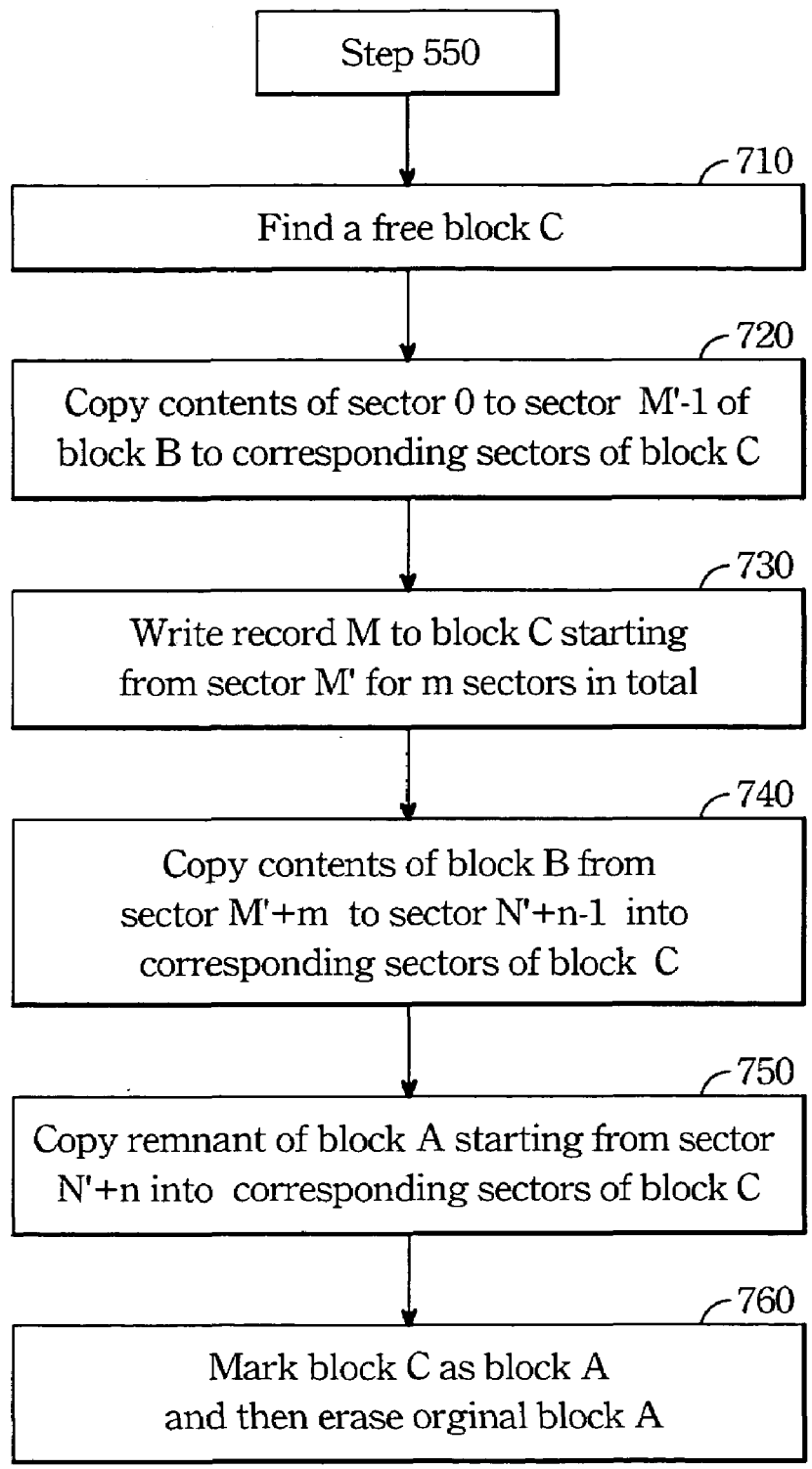

In case of (5), the destination block A contains data already but the destination sections therein are available for storing the data of the first record N and the second record M but the logic sector number of the record M is prior to the record N. In this situation, the programming procedures for the first record N are the same as aforementioned and thus the detailed descriptions are skipped. Only the procedures for the second record M are illustrated. Please see the flow chart in FIG. 6. In step 710, a free block C is found. In step 720, the data of the block B from the sector number 0 to the sector number M'-1 are copied to the corresponding sectors of the block C. In step 730, the data of the record M in the buffer are copied to the block C from the virtual sector number M' for m sectors in total. Thereafter, as is seen in step 740, the data in the block B from the virtual sector number M'+m to N'+n-1 are copied to the corresponding sections of the block C. The block C is thus served as a duplicated of block A. However, the block C furthermore has two records N and M. In step 760, the contents of the blocks A and B are erased. The block C is then marked as block A.

In case of (6), the destination block A contains data already and the destination sections in the block A are not available for the first record N. Surely, finding a free block is demanded.

Consequently, according to the present invention, if the value of FSP of the destination block is zero, the SVST is necessary for host accesses the data of the flash memory device. The SVST provides the corresponding relations of the virtual sector numbers of the destination block versus the logic sector numbers. If the FSP≠0, the host can read the data in the flash memory device the same as those in the optical or magnetic disk. The value of FSP provides the usage information of the block.

The benefits of the present invention:

With SVST for each block, the data filled into the destination block flash memory can be from the lowest page number no matter the lowest page number is the destination or not if the destination's block is free. The data in the buffer can still be written into the destination's block having data already if and only if the destination's sectors are free. Even the block is not complete free The data accessed from the flash memory according to the present invention are efficient.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A data accessed management system for a flash memory device, comprising:

said flash memory device having flash memories in a unit of physical block, each of said physical block being called an virtual block for storing data in a unit of virtual sector if said physical block is good;

a data management member chosen from a control chip set or a host;

a buffer for receiving a record N that are sent by a host in a unit of logic sector and are desired to be stored into destination virtual sectors of destination virtual block, said record N having n logical sections in total and starting destination being from sector number N', said N' be positive integral, a plurality of SVST (screen virtual sector table), each one for each said virtual block, which records the position relation between said logic sectors and said destination virtual sectors while the data are stored therein;

a plurality of V2P (virtual block to physical block), each of said V2P provided for each of said physical block itself, said V2P being constituted of one word memories to record (1) a virtual block number while said physical block is in good condition, (2) a free sector point (FSP), and (3) physical status of said physical block, further, said FSP being expressed by a binary code to record usage status of virtual sectors be used in said physical block; and therefore, record N are stored by said data management member starting from the sector number 0 of the destination block provided that said destination block is free, meanwhile said SVST and FSP are updated.

2. The data accessed management system according to claim 1 wherein said one word memories is totally 16 bits including 9 bits for recording a virtual block number, 6 bits for recording FSP status, and one bit for recording said physical block condition.

3. The data accessed management system according to claim 1 wherein said one word memories is totally k bits and said k is an integral number and is allotted in accordance with the virtual block numbers, sector numbers in each virtual block and one bit for recording said physical condition of said physical block.

4. The data accessed management system according to claim 1 wherein said FSP records usage status of virtual sectors in said virtual block while the predetermined destination of said logic sectors matched with said virtual sectors.

5. The data accessed management system according to claim 1 wherein said FSP is set to 0 for the predetermined destination of said logic sectors do not match with said virtual sectors.

6. The data accessed management system according to claim 1 further comprising method of writing the record N in said buffer into predetermined destination block B having data already, said method comprising the steps of:

finding a free virtual block C;

copy data of said block B from a virtual sector 0 to a virtual sector N'−1 into corresponding virtual sectors of said virtual block C;

writing said record N into said virtual block C from a virtual sector N' to a virtual sector N+n−1';

copy remnant of said block B starting from a virtual sector N'+n into corresponding virtual sectors of said virtual block C;

marking said block C as said block A; and erasing all of data in said block B.

* * * * *